UNITED STATES PATENT OFFICE.

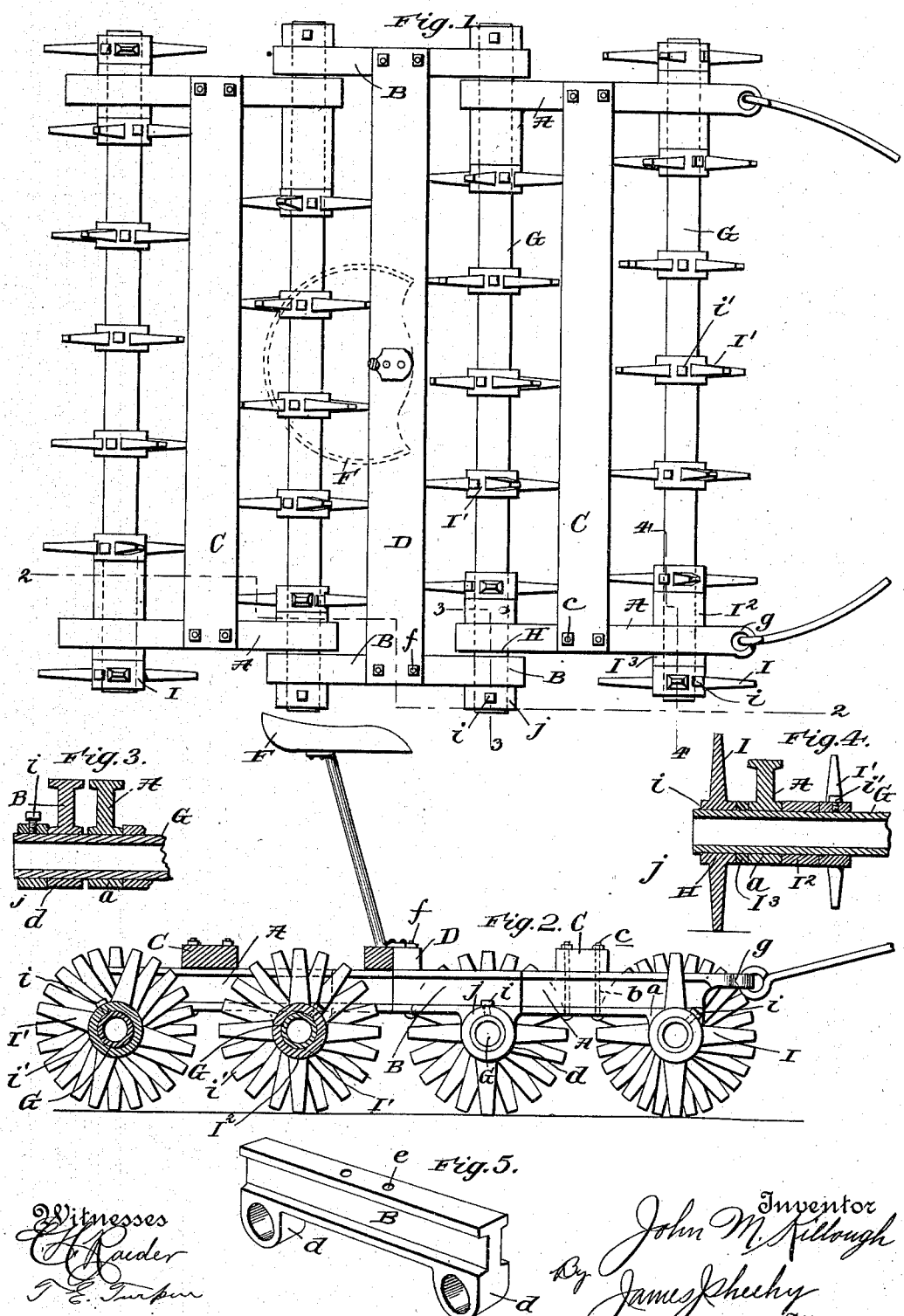

JOHN M. KILLOUGH, OF WACO, TEXAS.

HARROW.

SPECIFICATION forming part of Letters Patent No. 681,230, dated August 27, 1901.

Application filed April 25, 1901. Serial No. 57,470. (No model.)

*To all whom it may concern:*

Be it known that I, JOHN M. KILLOUGH, a citizen of the United States, residing at Waco, in the county of McLennan and State of Texas, have invented new and useful Improvements in Harrows, of which the following is a specification.

My invention relates to improvements in harrows of the clod crushing or pulverizing type; and it consists in a certain peculiar construction the novelty, utility, and advantages of which will be fully understood from the following description and claims when taken in conjunction with the accompanying drawings, in which—

Figure 1 is a plan view of my improved harrow with the driver's seat in broken lines and the seat-support in section. Fig. 2 is a view, partly in side elevation and partly in longitudinal section, taken on the broken line 2 2 of Fig. 1. Figs. 3 and 4 are detail sections taken in the planes indicated by the broken lines 3 3 and 4 4, respectively, of Fig. 1; and Fig. 5 is a perspective view of one of the links of the harrow-frame.

Similar letters of reference designate corresponding parts in all of the several views of the drawings.

In the preferred embodiment of my invention the harrow-frame is made up of forward and rear side bars A, which are made of steel or other suitable metal and are preferably I-shaped in transverse section, and links B, which are also of steel or other suitable metal and, by preference, of I shape in cross-section. The side bars are provided at their under sides adjacent to their ends with apertured lugs $a$ and are also preferably provided at about their middles with vertically-disposed apertures $b$ for the reception of bolts $c$, which serve to connect cross-timbers C to the side bars, as best shown in Fig. 1. The links B, like the side bars, have apertured lugs $d$ at their under sides and at or adjacent to their ends, and also have bolt-holes $e$ adjacent to their middles to receive bolts $f$, which connect a cross-timber D thereto, as shown. The cross-timbers C D do not form essential elements of the frame; but I prefer to employ them, since they serve to support weight when it is necessary to impose the same on the harrow, and one of them also serves for the connection of the support of the driver's seat F, as shown in Figs. 1 and 2. In addition to the lugs $a$ the forward side bars A have forward apertured extensions $g$ for the connection of a draft-bail; but these extensions are also not essential, since the draft animal or animals may be connected to the harrow in any suitable manner without departing from the scope of my invention.

G G are shafts interposed between the side bars A of the frame. The shafts G are preferably of gas-pipe for the sake of cheapness. The forward and rear shafts G are journaled in lugs $a$ of the side bars A and extend laterally outward from said side bars and have toothed wheels I fixed on their extended portions by a diametrically-disposed set-screw $i$, as shown, or other suitable means, while the intermediate shafts G are journaled in and extend through the coincident apertured lugs of the side bars and links and serve to connect the same together in a hinged manner. The said intermediate shafts G are provided at the outer sides of the links B with collars $j$, which are fixed on them by set-screws $i$ or other suitable means and have for their purpose to hold the links on the shafts.

It is obvious that when desired the forward and rear shafts G might be provided at their ends with collars $j$ in lieu of the toothed wheels I and that the intermediate shafts G might be provided with toothed wheels I in lieu of the collars $j$ without departing from the scope of my invention.

Fixed on the shafts G by set-screws $i'$ or other suitable means are toothed wheels I', calculated to crush or pulverize the clods of earth over which they pass. These toothed wheels are arranged about six inches apart on the shafts, and the toothed wheels on each shaft are arranged in alinement with the spaces between the toothed wheels of the next adjacent shaft or shafts, this in order to enable the rear toothed wheels to engage clods of earth that pass between the forward toothed wheels and insure the thorough crushing or pulverizing of all of the earth in the path of the harrow. It will also be observed that the teeth of the several toothed wheels all point in different directions, so that some of the teeth will be in the soil all the time and the wheeled shafts enabled to roll in a regular manner.

Spacing-collars I², interposed between the side bars A and links B and the toothed wheels I', adjacent thereto, and other spacing-collars I³, interposed between said bars and links and the outer toothed wheels I when the latter are employed, serve to hold the shafts G against endwise play or casual movement.

It will be readily observed from the foregoing that while the toothed wheels fixed on shafts, as described, are calculated to thoroughly crush or pulverize clods of earth in their paths and level and render the surface firm they are not liable to catch into grass or other trash or hang on stones, roots, and the like, and consequently render the harrow very easy of draft, also that when desired the harrow may be increased in width by simply using longer shafts G with a greater number of toothed wheels thereon.

It will further be observed from the foregoing that the several shafts bearing toothed wheels are linked together, and consequently the raising of one shaft by a stone, stump, or other obstruction in the path of the harrow will not affect the other shafts, which will remain on the ground and to their work.

The construction described is further advantageous, since the shafts G may be made of gas-pipe or other cheap material and the side bars A and links B of steel or other metal calculated to withstand friction, and when the shafts are worn their position in the side bars and links may be readily changed. The manner described of connecting the wheeled shafts to the side bars A and links B is also advantageous, because of the facility with which the parts may be connected and disconnected, and in this connection it will be noticed that when one of the shafts is removed from the frame one or all of its toothed wheels may be readily removed for the purpose of repair and as readily replaced and secured in their original or new positions.

I have entered into a detail description of the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. In a harrow of the type described, the combination of the forward and rear side bars having transversely-disposed apertures, links arranged parallel to said side bars and having transversely-disposed apertures arranged coincident with the inner apertures of the side bars, transverse shafts journaled in the outer transverse apertures of the side bars and extending outwardly beyond said bars, transverse shafts journaled in the alined apertures of the side bars and links and extending outwardly beyond the same, teeth on the portions of the shafts between the side bars and links, and detachable means on the extended portions of the shafts for holding the side bars and links thereon.

2. The harrow described comprising the forward and rear side bars having transversely-disposed apertures, links arranged parallel to said side bars and having transversely-disposed apertures arranged coincident with the inner apertures of the side bars, transverse shafts journaled in the outer apertures of the side bars and extending outwardly beyond the same, transverse shafts journaled in the alined apertures of the side bars and links and extending outwardly beyond the same; said shafts being tubular, toothed wheels detachably secured on the shaft at intervals between the side bars and the links of the frame, and so arranged that the wheels of each shaft are in alinement with the spaces between the wheels on the adjacent shaft or shafts, collars interposed between the side bars and links and the toothed wheels adjacent thereto, and means detachably secured on the outwardly-extending end portions of the shafts for securing the side bars and links thereon.

In testimony whereof I have hereunto set my hand in presence of two subscribing witnesses.

JOHN M. KILLOUGH.

Witnesses:
TOM. S. HOLLON,
ARTHUR H. DENNISS.